US010872035B1

(12) United States Patent
Vogan

(10) Patent No.: US 10,872,035 B1
(45) Date of Patent: Dec. 22, 2020

(54) SYSTEMS AND METHODS FOR MANAGING AN ARTIFICIALLY LIMITED LOGICAL SPACE OF NON-VOLATILE MEMORY

(71) Applicant: Apple Inc., Cupertino, CA (US)

(72) Inventor: Andrew W. Vogan, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 61 days.

(21) Appl. No.: 16/425,565

(22) Filed: May 29, 2019

(51) Int. Cl.
  *G06F 12/00* (2006.01)
  *G06F 12/02* (2006.01)
  *G06F 3/06* (2006.01)
  *G06F 12/06* (2006.01)

(52) U.S. Cl.
  CPC ........ *G06F 12/0246* (2013.01); *G06F 3/0604* (2013.01); *G06F 3/0631* (2013.01); *G06F 3/0638* (2013.01); *G06F 3/0674* (2013.01); *G06F 12/0646* (2013.01); *G06F 2212/2022* (2013.01); *G06F 2212/7202* (2013.01)

(58) Field of Classification Search
  None
  See application file for complete search history.

(56) References Cited

U.S. PATENT DOCUMENTS

| 2013/0227198 | A1* | 8/2013 | Lee | G06F 12/0246 711/103 |
| 2014/0281687 | A1* | 9/2014 | Vogan | G06F 11/1068 714/6.13 |
| 2018/0196749 | A1* | 7/2018 | Koo | G06F 12/0866 |

* cited by examiner

*Primary Examiner* — Jason W Blust
(74) *Attorney, Agent, or Firm* — Van Court & Aldridge LLP

(57) ABSTRACT

Systems and methods for managing non-volatile memory devices are provided. Embodiments discussed herein define a native logical space to manage relatively high volume data write operations and define an artificially limited logical space to manage relatively low volume data write operations. The native logical space may include native logical bands that are mapped to a native number of physical blocks to enable high volume, high data transfer of data. The artificially limited logical space may include artificially limited logical bands that are mapped to an artificially limited number of available physical blocks. The artificially limited logical bands are better suited for low volume, low data transfer of data and do not unnecessarily tie up a native number of physical blocks.

20 Claims, 5 Drawing Sheets

SYSTEMS AND METHODS FOR MANAGING AN ARTIFICIALLY LIMITED LOGICAL SPACE OF NON-VOLATILE MEMORY

TECHNICAL FIELD

This patent specification generally relates to non-volatile memory devices, and more particularly, to managing logical spaces of non-volatile memory.

BACKGROUND

Various types of non-volatile memory ("NVM"), such as flash memory (e.g., NAND flash memory and NOR flash memory), can be used for mass storage. For example, consumer electronics (e.g., portable media players) use flash memory to store data, including music, videos, images, and other types of information. One particular class of NVM is solid state devices (SSDs). SSDs are becoming increasing larger, thereby allowing ever increasing amounts of data to be rapidly written thereto. However, a result of the increasingly larger sized SSD is that the size of a writable block has become too large for certain types of data, such as transaction journaling data. This requires the system to dedicate an entire writable block to these certain types of data that do not require the same size and bandwidth as other data. Accordingly, a more efficient way of managing the NVM is needed.

SUMMARY

Systems and methods for managing non-volatile memory devices are provided. Embodiments discussed herein define a native logical space to manage relatively high volume data write operations and define an artificially limited logical space to manage relatively low volume data write operations. The native logical space may include native logical bands that are mapped to a native number of physical blocks to enable high volume, high data transfer of data. The artificially limited logical space may include artificially limited logical bands that are mapped to an artificially limited number of available physical blocks. The artificially limited logical bands are better suited for low volume, low data transfer of data and do not unnecessarily tie up a native number of physical blocks.

In one embodiment, a method implemented in a system is provided. The system can include non-volatile memory having a plurality of dies, each of the plurality of dies including a plurality of planes, and each of the plurality of planes including a plurality of physical blocks. The method includes classifying the plurality of dies as a physical space array of bands and die-in-planes (dips), wherein a physical block exists at each intersection of a band and a dip, and wherein a native number of dips exist in each band of the physical space array; defining a native logical space that includes a plurality of native logical bands that logically overlay and represent the physical space array, wherein the native logical bands are used for managing relatively high volume data writes, and wherein each of the plurality of native logical bands are operative to write data to the native number of dips; and defining an artificially limited logical space that includes a plurality of artificially limited logical bands that exist outside of the native logical space, wherein the artificially limited logical bands are used for managing relatively low volume data writes, and wherein each of the artificially limited logical bands is operative to write data to a limited number of dips that is less than the native number of dips.

In another embodiment, a system is provided that includes non-volatile memory having a plurality of dies, each of the plurality of dies including at least two planes, and each of the at least two planes including a plurality of physical blocks, and control circuitry configured to classify the plurality of dies as a physical space array of bands and die-in-planes (dips), wherein a physical block exists at each intersection of a band and a dip, and wherein a native number of dips exist in each band of the physical space array. The control circuitry can define a native logical space that includes a plurality of native logical bands that logically overlay and represent the physical space array, wherein the native logical bands are used for managing relatively high volume data writes, and wherein each the plurality of native logical bands are operative to write data to the native number of dips. The control circuitry can define an artificially limited logical space that includes a plurality of artificially limited logical bands that exist outside of the native logical space, wherein the artificially limited logical bands are used for managing relatively low volume data writes, and wherein each of the artificially limited logical bands is operative to write data to a limited number of dips that is less than the native number of dips, use the native logical space to write the relatively high volume data to the non-volatile memory, and use the artificially limited logical space to write relatively low volume data to the non-volatile memory.

In yet another embodiment, a method implemented in a system having non-volatile memory is provided. The method can include defining a native logical space comprising a first plurality of logical bands each comprising a first number of logical blocks, wherein the logical blocks in each of the first plurality of logical blocks are configured to be mapped to a second number of physical blocks; defining an artificially limited logical space comprising a second plurality of logical bands each comprising the first number of logical blocks, wherein a first portion of the logical blocks in each of the second plurality of logical bands are mapped to a third number of physical blocks, wherein a second portion of the logical blocks in each of the second plurality of logical bands are marked as do not use blocks, and wherein the third number of physical blocks is less than the second number of physical blocks; using the native logical space to write relatively high volume data to the non-volatile memory; and using the artificially limited logical space to write relatively low volume data to the non-volatile memory.

A further understanding of the nature and advantages of the embodiments discussed herein may be realized by reference to the remaining portions of the specification and the drawings.

DETAILED DESCRIPTION

In the following detailed description, for purposes of explanation, numerous specific details are set forth to provide a thorough understanding of the various embodiments described herein. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming, but would nevertheless be a routine engineering undertaking for those of ordinary skill in the art having the benefit of this disclosure.

Figure 1:
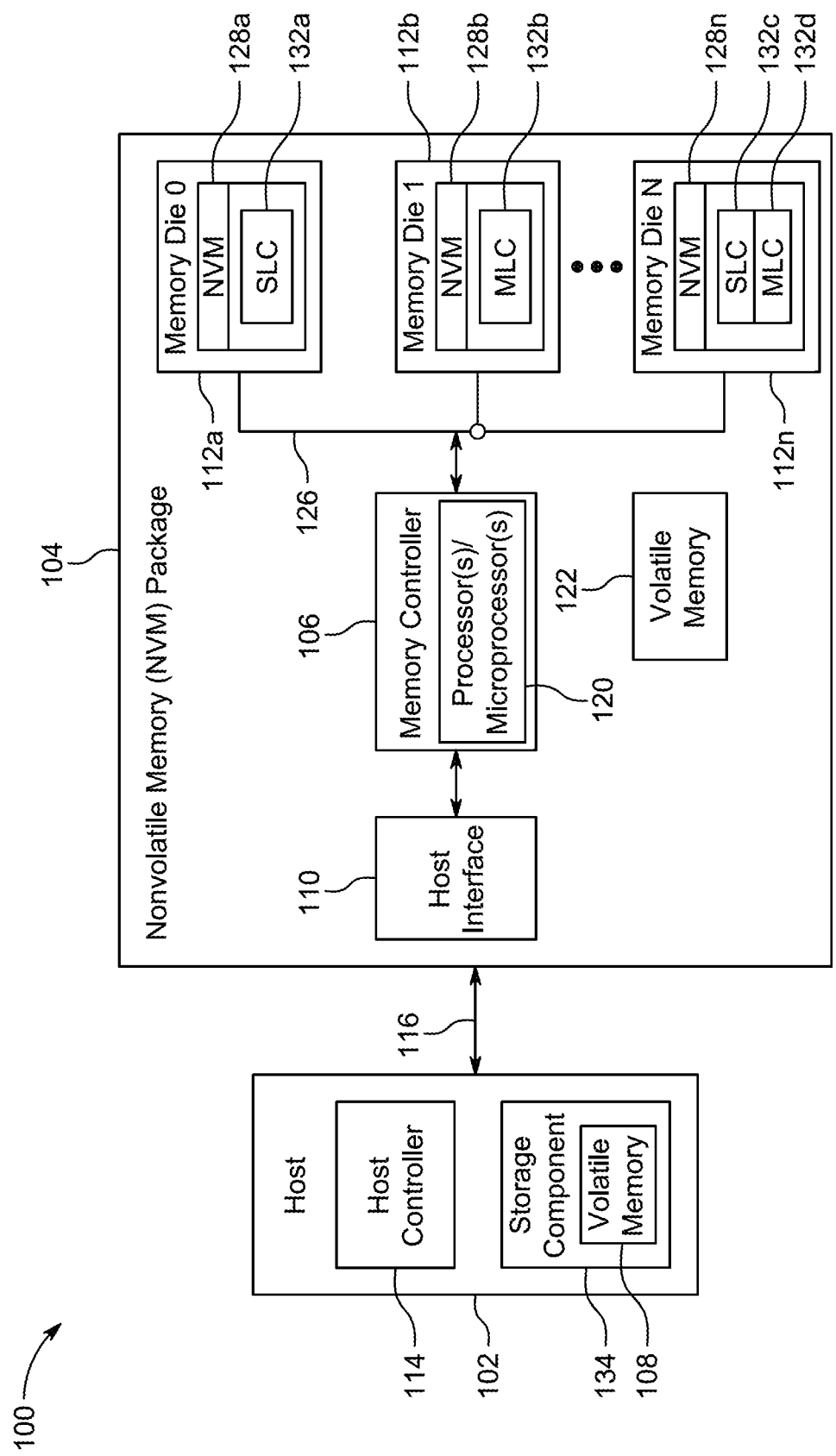
FIG. 1 is a diagram depicting an illustrative system that includes a host and an NVM package with a memory controller, according to various embodiments.

FIG. 1 is a diagram depicting system 100, including NVM package 104 and host 102. Host 102 may be configured to provide memory access requests (e.g., read, write, and erase commands) to NVM package 104, which can include memory controller 106, host interface 110, and NVM dies 112 a-n with corresponding NVMs 128 a-n.

Host 102 can be any of a variety of host devices and/or systems, such as a portable media player, a cellular telephone, a pocket-sized personal computer, a personal digital assistant ("PDA"), a desktop computer, a laptop computer, and/or a tablet computing device. NVM package 104 can include NVMs 128 a-n (e.g., in NVM dies 112 a-n) and can be a ball grid array package or other suitable type of integrated circuit ("IC") package. NVM package 104 can be part of and/or separate from host 102. For example, host 102 can be a board-level device and NVM package 104 can be a memory subsystem that is installed on the board-level device. In other embodiments, NVM package 104 can be coupled to host 102 with a wired (e.g., SATA) or wireless (e.g., Bluetooth™) interface.

Host 102 can include host controller 114 that is configured to interact with NVM package 104. For example, host 102 can transmit various access requests, such as read, write, and erase commands, to NVM package 104. Host controller 114 can include one or more processors and/or microprocessors that are configured to perform operations based on the execution of software and/or firmware instructions. Additionally or alternatively, host controller 114 can include hardware-based components, such as application-specific integrated circuits ("ASICs"), that are configured to perform various operations. Host controller 114 can format information (e.g., commands and/or data) transmitted to NVM package 104 according to a communications protocol shared between host 102 and NVM package 104.

Host controller 114 can obtain temperature measurements for system 100 from one or more ambient temperature sensors 136. Temperature sensor 136 is depicted in FIG. 1 as a dashed box to illustrate that it can be located in any suitable location, such as, for example, on a board and/or affixed to a housing of system 100. Ambient temperature sensors 136 may be used by host controller 114 (or other component of system 100) to determine the external temperature of the host.

Host 102 can include volatile memory 108. Volatile memory 108 can be any of a variety of volatile memory types, such as cache memory or RAM. Host 102 can use volatile memory 108 to perform memory operations and/or to temporarily store data that is being read from and/or written to NVM package 104. For example, volatile memory 108 can temporarily store a set of access requests to be sent to, or to store data received from, NVM package 104.

Host 102 can communicate with NVM package 104 over communications channel 116 using host interface 110 and memory controller 106. Communications channel 116 can be any bus suitable for bidirectional communications. Communications channel 116 can be fixed, detachable, or wireless. Communications channel 116 can be, for example, a universal serial bus (USB), serial advanced technology (SATA) bus, or any other suitable bus.

Memory controller 106 can include one or more processors and/or microprocessors 120 that are configured to perform operations based on the execution of software and/or firmware instructions. Additionally or alternatively, memory controller 106 can include hardware-based components, such as ASICs, that are configured to perform various operations. Memory controller 106 can perform a variety of operations, such as dispatching commands issued by host 102.

Host controller 114 and memory controller 106, alone or in combination, can perform various memory management functions, such as garbage collection and wear leveling. In implementations where memory controller 106 is configured to perform at least some memory management functions, NVM package 104 can be termed "managed NVM" (or "managed NAND" for NAND flash memory). This can be in contrast to "raw NVM" (or "raw NAND" for NAND flash memory), in which host controller 114, external to NVM package 104, performs memory management functions for NVM package 104. In some embodiments, NVM package 104 can be termed a solid state drive (SSD).

In some embodiments, host controller 114 and memory controller 106 can be part of the same memory device. Although there can be overlap, host controller 114 and memory controller 106 can perform different roles. For example, host controller 114 may perform and provide user-facing functionality for the memory device, such as performing operations to provide a user interface and responding to user input (e.g., requests to play a particular media file). Memory controller 106 may perform and provide memory-based functionality for the memory device, such as implementing memory access requests from host controller 114 (e.g., converting from logical to physical addressing), performing memory management operations, and/or performing ECC operations.

As depicted in FIG. 1, memory controller 106 can be incorporated into the same package as NVM dies 112 a-n. In other embodiments, memory controller 106 may be physically located in a separate package or in the same package as host 102. In some embodiments, memory controller 106 may be omitted, and all memory management functions that are normally performed by memory controller 106 (e.g., garbage collection and wear leveling) can be performed by a host controller (e.g., host controller 114). Memory controller 106 or host 102 can include a flash translation layer (FTL) for maintaining a logical-to-physical mapping.

NVM package 104 may include volatile memory 122. Volatile memory 122 can be any of a variety of volatile memory types, such as cache memory or RAM. Memory controller 106 can use volatile memory 122 to perform access requests and/or to temporarily store data that is being read from and/or written to NVMs 128 a-n in NVM dies 112 a-n. For example, volatile memory 122 can store firmware and memory controller 106 can use the firmware to perform operations on NVM package 104 (e.g., read/program operations). In some embodiments, volatile memory 122 can be included within memory controller 106.

Memory controller 106 can obtain temperature measurements for NVM package 104 from one or more temperature sensors. Temperature sensors can be located in any suitable location, such as, for example, on a board, within memory controller 106, and/or affixed to the packaging of NVM package 104. Temperature sensors may be used by memory controller 106 (or other component of system 100) to determine the environmental temperature of NVM package 104.

Memory controller 106 can use shared internal bus 126 to access NVMs 128 *a-n* and can use NVMs 128 *a-n* to persistently store a variety of information, such as debug logs, instructions, and firmware that NVM package 104 uses to operate. Although only one shared internal bus 126 is depicted in NVM package 104, an NVM package can include more than one shared internal bus. Each internal bus can be connected to multiple (e.g., 2, 3, 4, 8, 32, etc.) memory dies as depicted with regard to NVM dies 112 *a-n*. NVM dies 112 *a-n* can be physically arranged in a variety of configurations, including a stacked configuration, and may be, according to some embodiments, integrated circuit ("IC") dies.

NVMs 128 *a-n* can be any of a variety of NVM, such as NAND flash memory based on floating gate or charge trapping technology, NOR flash memory, erasable programmable read only memory ("EPROM"), electrically erasable programmable read only memory ("EEPROM"), ferroelectric RAM ("FRAM"), magnetoresistive RAM ("MRAM"), phase change memory ("PCM"), or any combination thereof. In one embodiment, NVMS 128*a-n* can be three-dimensional (3D) Nand. 3D Nand improves on regular two-dimensional storage by stacking storage cells in increase capacity through higher density, lower cost per gigabyte, and provides reliability, speed, and performance expected of solid-state memory. MLC refers to programming multiple bits per cell, whereas single cell mode (SLC) refers to programming one bit per cell. In some embodiments, a subset of MLC can be a 2-bit cell, which can be programed with two bits per cell. In other embodiments, a subset of MLC can be a three level cell (TLC), which can be programmed with three bits per cell.

NVMs 128 *a-n* can be organized into "blocks", which can the smallest erasable unit, and further organized into "pages", which can be the smallest unit that can be programmed or read. In some embodiments, NVMs 128 *a-n* can include multiple integrated circuits or dies, where each integrated circuit may have multiple blocks. Memory locations (e.g., blocks or pages of blocks) from corresponding integrated circuits may form "super blocks". Each memory location (e.g., page or block) of NVMs 128 *a-n* can be referenced using a physical address (e.g., a physical page address or physical block address). Memory locations (e.g., blocks or pages of blocks) from corresponding integrated circuits may be logically grouped together to form "bands". Bands can provide operational parallelism, thereby enabling programming, reading, and erase operations to be performed in parallel for blocks located on different integrated circuits. Each memory location of NVMs 128*a-n* can be referenced using a physical address (e.g., a physical page address or physical block address). In one embodiment, a stripe can refer to a multi-plane page taken from multiple dies (e.g., all dies). A band can refer to a multi-plane block taken from multiple dies (e.g., all dies). For example a band can span each plane of each die in the NVM.

Figure 2:
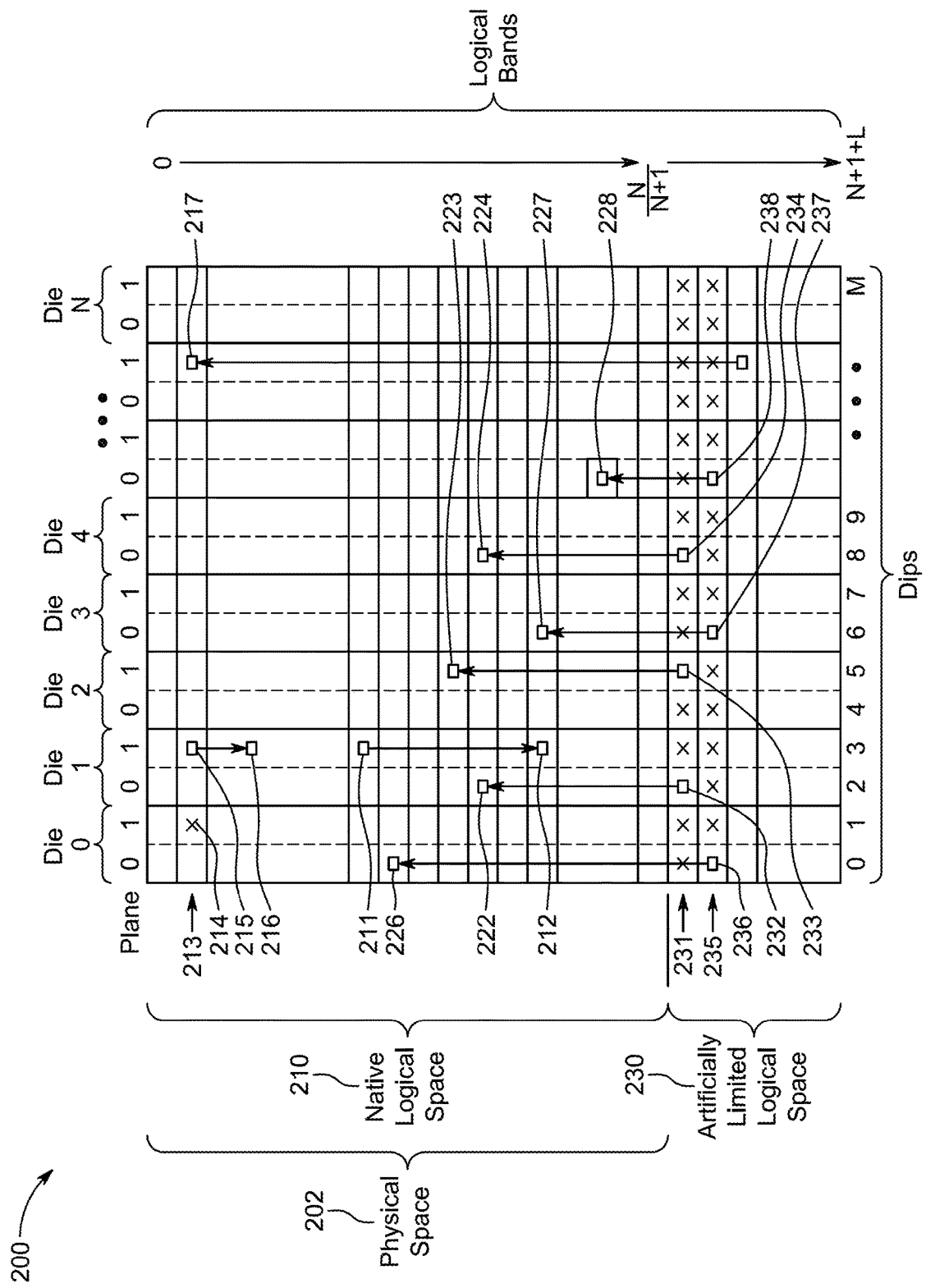
FIG. 2 shows illustrative array that represents a logical space arrangement of NVM according to an embodiment.

Many NVMs manufactured today include multiple dies, each having multiple planes. Thus, the physical arrangement of the NVMs can be relatively complicated and referring to blocks or pages in the physical space can be cumbersome. Embodiments discussed herein and shown in FIG. 2 organize the physical space in a linearized two-dimensional array of logical bands and logical die-in-planes (DIPS). FIG. 2 shows array 200, which represents a logical space arrangement of the physical space. The logical bands span array 200 in the horizontal direction (across each die) and the logical dips span array 200 in the vertical direction (within their respective planes). Array 200 shows that there are N dies and that each die has two planes, shown by the 0 and 1 identifiers for each die. The dips are numbered in sequence from to 0 to M, where each dip corresponds to a particular plane of a particular die, and where M is the product of the number dies and the number of planes per die. If there are 64 dies and 2 planes per die, M is 128 dips. For example, dip #4 corresponds to die 2, plane 0, and dip #5 corresponds to die 2, plane 1.

Native logical space 210 may be defined within array 200 to include a first plurality of logical bands, shown as logical bands 0 through N. The first plurality of logical bands may be equal to or approximate the number of physical blocks in each plane, as illustrated by the overlapping of native logical space 210 over physical space 202. This way, the first plurality of logical bands can approximate the native physical arrangement of the NVM. For example, each intersection of a band and a dip may correspond to a logical block, and that logical block is mapped to a physical block. In some instances the logical block at a particular band/dip intersection may correspond to the same physical block at that particular band/dip intersection. In other instances, the logical block may correspond to a physical block located elsewhere within the NVM. In a specific instance, the logical block at a particular band/dip intersection may be revectored to a physical block located in the same dip, but at a different band. For example, logical block 211 may be revectored to physical block 212, where physical block 212 is in the same dip as the physical block that exists at the intersection of the band/dip at logical block 211. The physical block located at a particular intersection of the band/dip may correspond to one of a good physical block and a bad physical block, and a logical block at a particular intersection of the band/dip may be mapped to the physical block that exists at that particular intersection or is mapped or revectored to another physical block.

When NVM is implemented as a solid state drive (SSD), the number of dies being used can be substantial (e.g., 128 dies or 256 dies), and if each die has two or four planes, the size of a native band can be very substantial. For example, if the NVM has 128 dies with 2 planes per die, this may result in each native band having 256 dips. This results in large chunks of data storage that benefit from parallel concurrency when all dies (or subset of all dies) are written at once. The parallel concurrency increases bandwidth, thereby resulting in faster write and read operations. During use of the NVM, many different data types can benefit from being rapidly written to the relatively large (and natively sized) bands. For example, user data, file system data, data classified as static or dynamic data, or other relatively high volume data may be particularly well suited for storage in the relatively large (and natively sized) bands. Other data types are used in relatively low volume and low speed applications and thus do not need to be stored in the relatively large (and natively sized) bands. Such low volume/low speed data may be stored in artificially limited bands according to embodiments discussed herein. This way, the low volume/low speed data can be stored in the NVM without tying up the natively sized bands. An example of low volume/low speed data can include a content log (CLOG). The CLOG can be a chronological journal of all transaction information related to changes of the NVM. The CLOG is accessed during NVM mount time to bring the NVM to a coherent state prior to use. It should be understood that other types of low volume/low speed data can be stored in artificially limited bands according to embodiments discussed herein.

Native logical space 210 can manage the logical to physical mapping of the natively sized bands. Native logical space 210 can have knowledge of which physical blocks are good and bad, and which logical blocks have been revectored to other physical blocks. In some embodiments, native logical space 210 can have prior knowledge of which physical blocks are bad and which logical blocks have been revectored by accessing a block manager. The block manager may also know which physical blocks are free (e.g., have not had any data written thereto).

Artificially limited logical space (ALLS) 230 can manage the logical to physical mapping of the artificially limited bands, shown as logical bands N+1 through N+1+L, where L is the size of the artificially limited logical size in band space. ALLS 230 may be defined within array 200 to include a second plurality of logical bands that do not overlap any of the first plurality of logical bands associated with native logical space 210. An artificially limited band includes a limited subset of the available number of physical blocks of a native band. In some embodiments, the number of physical blocks included in an artificially limited band can be one or two orders of magnitudes less than the number of blocks available in the native band. For example, in some embodiments, an artificially limited band can include three, four, five, or six physical blocks. In addition, the second plurality of logical bands is substantially less than the first plurality of logical bands. The number of the second plurality can be two to four orders of magnitude less than the number of the first plurality. For example, there may be thousands of the first plurality of logical bands, but less than ten of the second plurality of logical bands.

Assuming, for example, that each artificially limited band includes only three physical blocks, ALLS 230 can revector three logical blocks to three good blocks in the physical space that are free, effectively stealing these three physical blocks from native logical space 210. Following this example, artificially limited band 231 can include M number of logical blocks, but only three of which (i.e., logical blocks 232-234) are revectored to a good physical block that is free. As shown logical block 232 is revectored to physical block 222, logical block 233 is revectored to physical block 223, and logical block 234 is revectored to physical block 224. The remaining logical blocks (e.g., those shown with X's) are treated as step over blocks or do not use blocks. Further following this example, artificially limited band 235 can include M number of logical blocks, but only three of which (i.e., logical blocks 236-238) are revectored to a good physical block that is free. As shown logical block 236 is revectored to physical block 226, logical block 237 is revectored to physical block 227, and logical block 238 is revectored to physical block 228.

Figure 3:
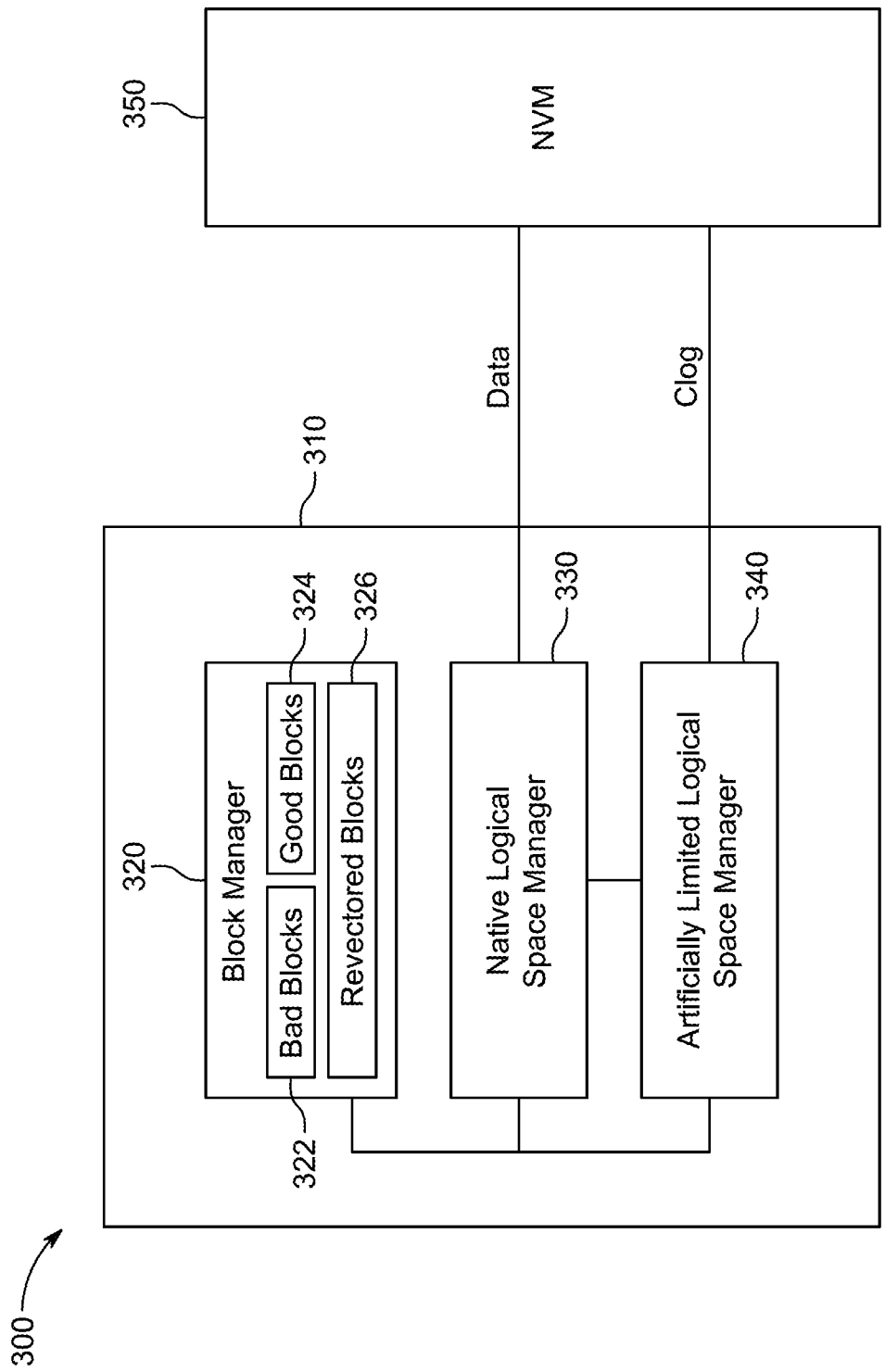
FIG. 3 shows an illustrative block diagram of NVM system according to an embodiment.

FIG. 3 shows an illustrative block diagram of NVM system 300 according to an embodiment. System 300 can include various modules that are implemented by control circuitry 310 for controlling native logical bands and artificially limited logical bands associated with NVM 350 according to embodiments discussed herein. Control circuitry 310 can include block manager module 320, native logical space manager module 330, and artificially limited logical space manager 340. Block manager module 320 may keep of information related to the physical blocks of the NVM. For example, block manager module 320 knows which physical blocks are bad (bad blocks 322), which physical blocks are good and free (good blocks 324), and which physical blocks are part of a revectoring (revectored blocks 326).

Native logical space manager module 330 can manage the native logical blocks associated with NVM 350. For example, when system 300 writes data to NVM 350, module 330 can open a native logical band for controlling where in NVM 350 the data will be written. In an ideal case, the native logical band has a one-to-one correspondence between logical blocks and physical blocks, however, this is not always possible because of the potential for a native band to have one or more bad physical blocks and one or more revectored blocks. By accessing block manager module 310, for example, module 330 has knowledge of which physical blocks should be used in connection with the open native logical band. For example, assuming logical native band 213 is opened to write data to the physical space, as shown FIG. 2, this band includes bad block 214 and revectored blocks 215 and 217. Thus, when data is being written to band 213, module 330 knows it can write data to all logical blocks except the bad block. When data is written to block 215, the data is written to the revectored location at block 216. Data cannot be written to block 217 because this block has been "stolen" for use by an artificially limited logic band.

Artificially limited logical space manager 340 can manage the artificially limited logical blocks associated with NVM 350. For example, when system 300 writes low volume/low bandwidth data (e.g., CLOG data) to NVM 350, module 340 opens one of the artificially limited logical bands and writes the data thereto. Artificially limited logical space manager 340 may create a fixed number of artificially limited logical bands (e.g., the second plurality of logical bands as discussed above in connection with FIG. 2), for example, during initialization of the NVM. For each artificially limited logical band, module 340 can map a fixed number of logical blocks to good and free blocks, and set the remainder of the logical blocks in that band as do not use blocks or pass over blocks. Module 340 may access block manager module 320 to determine which good blocks are free and available for inclusion in the artificially limited logical band. The blocks selected for inclusion in each artificially limited logical band may be selected based on a variety of criteria. For example, the blocks may be selected from different dies to guard against data loss if a particular die fails. The blocks may be selected from native logical bands that have less than an average number of bad blocks, revectored blocks, or a combination thereof.

After blocks in the native logical bands are selected for inclusion in the artificially limited logical blocks, the native logical bands may be updated to account for the revectoring of the selected blocks. For example, referring to FIG. 2, when logical block 238 is revectored to logical block 228, native logical space manager module 330 can update the native logical band including block 228 to indicate that block 228 is no longer available.

Figure 4:
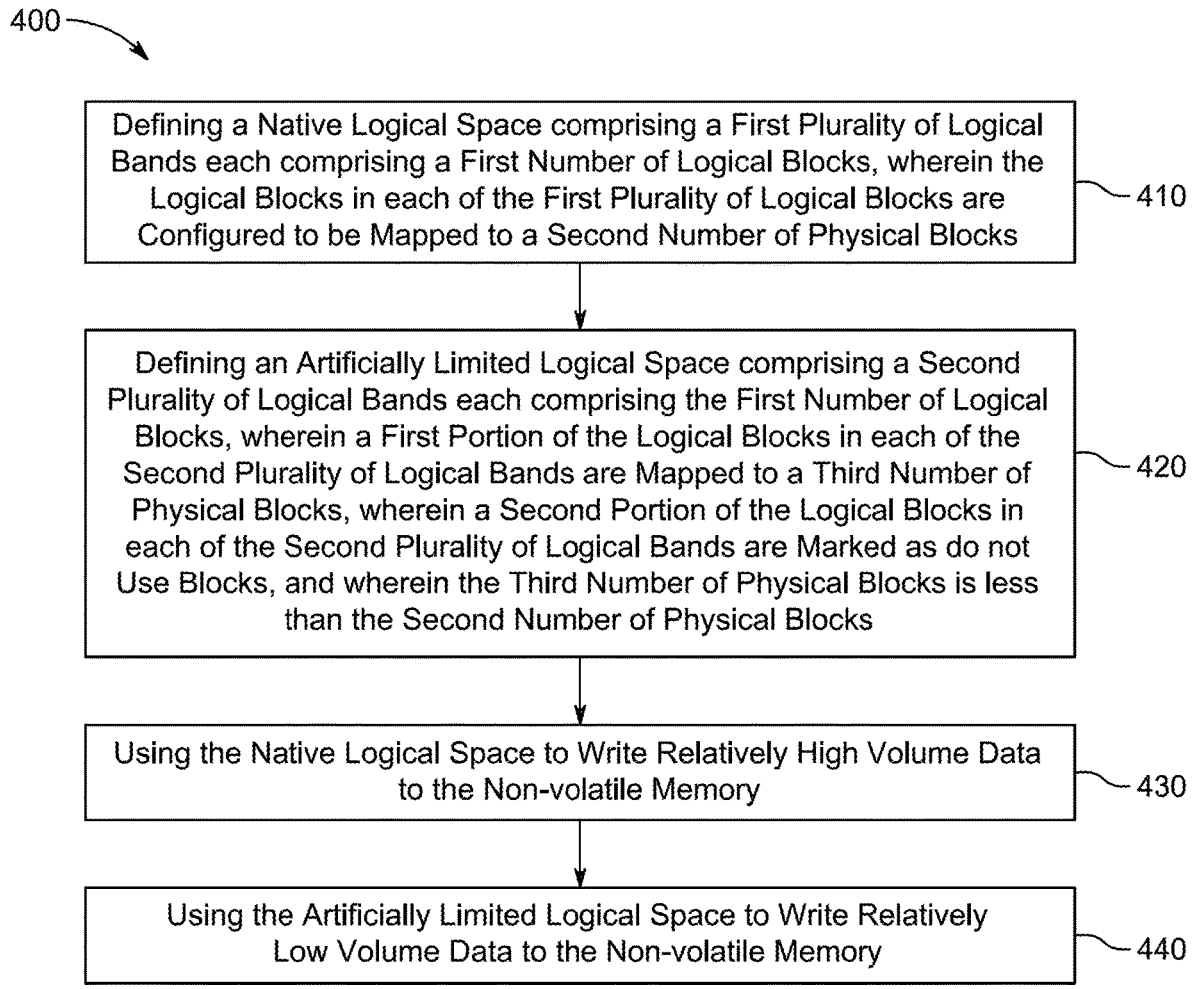
FIG. 4 shows illustrative process according to an embodiment.

FIG. 4 shows illustrative process 400 according to an embodiment. Process 400 may be implemented in a system having non-volatile memory. Starting at step 410 process 400 can define a native logical space including a first plurality of logical bands each having a first number of logical blocks. For example, the native logical space may be similar to space 210 of FIG. 2. The logical blocks in each of the first plurality of logical blocks are configured to be mapped to a second number of physical blocks. For example, the logical blocks in one of the logical bands are mapped to the physical blocks having one-to-one parity with the logical blocks. Thus, in this particular example, the second number is the same as the first number.

At step 420, process 400 can define an artificially limited logical space including a second plurality of logical bands each having the same first number of logical blocks as that in the first plurality of logical bands. A first portion of the logical blocks in each of the second plurality of logical bands can be mapped to a third number of physical blocks. A second portion of the logical blocks in each of the second plurality of logical bands are marked as do not use blocks. The third number of physical blocks is less than the second number of physical blocks. For example, assuming that there are 64 logical blocks per logical band, four logical blocks may be mapped to physical blocks, and the remaining 60 logical blocks may be set as do not use blocks. Physical blocks that are mapped to logical blocks in the second plurality of logical blocks cannot be used by the first plurality of logical blocks. In some embodiments, the third number is at least one order of magnitude less than the second number.

At step 430, process 400 can use the native logical space to write relatively high volume data to the non-volatile memory. At step 440, process 400 can use the artificially limited logical space to write relatively low volume data to the non-volatile memory.

It should be appreciated that the steps shown in FIG. 4 are merely illustrative and that additional steps may be added, some steps may be omitted, and the order of the steps can be changed.

Figure 5:
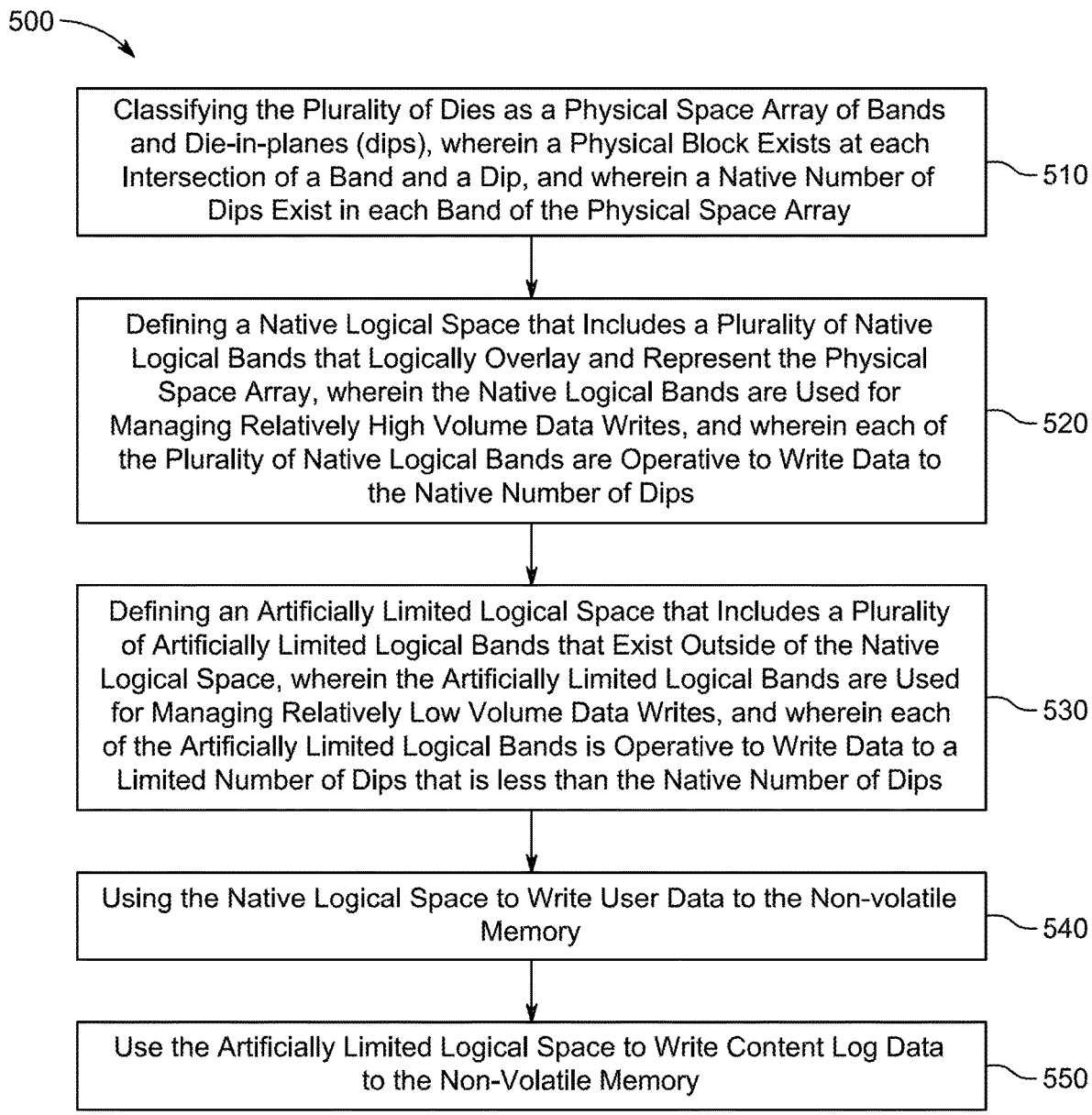
FIG. 5 shows another illustrative process according to an embodiment.

FIG. 5 shows illustrative process 500 according to an embodiment. Process 500 can be implemented in system having non-volatile memory that includes dies, each having two or more planes, and each of the planes further includes several physical blocks. Process 500 can begin at step 510 by classifying the dies as a physical space array of bands and die-in-planes (dips), wherein a physical block exists at each intersection of a band and a dip, and wherein a native number of dips exist in each band of the physical space array. A native number of dips may be equal to the product of the number of dies and number of planes. See array 200 of FIG. 2, for example. At step 520, process 500 can define a native logical space that includes several native logical bands that logically overlay and represent the physical space array. The native logical bands are used for managing relatively high volume data writes (e.g., user data), and each of the native logical bands are operative to write data to the native number of dips.

At step 530, process 500 can define an artificially limited logical space (e.g., space 230) that includes a several artificially limited logical bands that exist outside of the native logical space. The artificially limited logical bands are used for managing relatively low volume data writes (e.g., content LOG data), and each of the artificially limited logical bands is operative to write data to a limited number of dips that is less than the native number of dips. Each of the artificially limited logical bands can include several logical blocks, where a first subset of the logical blocks are mapped to the limited number of dips, and where a second subset of the logical blocks are mapped as do not use blocks. The combination of the first subset and the second subset is equal to the total number of logical blocks each artificially limited logical band.

Many different criteria may be applied by process 500 when selecting which physical blocks are mapped to the logical blocks in the artificially limited logical band. One such criteria is that the limited number of dips are selected from good physical blocks that are free and exist within the logical native space. Another criteria is that the limited number of dips are selected from good physical blocks based on an averaging metric that ensures that a native logical band in the native logical space is not adversely affected by having a good physical block redirected from that particular band. Yet other criteria may require that the limited number of dips are selected from good physical blocks based on which die each dip of the limited number of dips is located.

The physical footprint occupied by of the artificially limited logical bands is such that the number of artificially limited logical bands is at least two orders of magnitude less than the number of native logical bands and that the limited number of dips is at least two orders of magnitudes less than the native number of dips. This sizing advantageously enables process 500 to use the native logical space to write user data to the NVM (at step 540) and to use the artificially limited logical space to write content log data to the NVM (at step 550).

It should be appreciated that the steps shown in FIG. 5 are merely illustrative and that additional steps may be added, some steps may be omitted, and the order of the steps can be changed.

Many alterations and modifications of the preferred embodiments will no doubt become apparent to a person of ordinary skill in the art after having read the foregoing description, it is to be understood that the particular embodiments shown and described by way of illustration are in no way intended to be considered limiting. Thus, references to the details of the described embodiments are not intended to limit their scope.

What is claimed is:

1. A method implemented in a system comprising non-volatile memory comprising a plurality of dies, each of the plurality of dies comprising a plurality of planes, and each of the plurality of planes comprising a plurality of physical blocks, the method comprising:
    classifying the plurality of dies as a physical space array of bands and die-in-planes (dips), wherein a physical block exists at each intersection of a band and a dip, and wherein a native number of dips exist in each band of the physical space array;
    defining a native logical space that includes a plurality of native logical bands that logically overlay and represent the physical space array, wherein the native logical bands are used for managing relatively high volume data writes, and wherein each of the plurality of native logical bands are operative to write data to the native number of dips; and
    defining an artificially limited logical space that includes a plurality of artificially limited logical bands that exist outside of the native logical space, wherein the artificially limited logical bands are used for managing relatively low volume data writes, and wherein each of the artificially limited logical bands is operative to write data to a limited number of dips that is less than the native number of dips.

2. The method of claim 1, wherein each of the artificially limited logical bands comprises a plurality of logical blocks, wherein a first subset of the plurality of logical blocks is mapped to the limited number of dips, and wherein a second subset of the plurality of logical blocks is mapped as do not use blocks, wherein a combination of the first subset and the second subset is equal to the plurality of logical blocks.

3. The method of claim 2, wherein the limited number of dips are selected from good physical blocks that are free and exist within the logical native space.

4. The method of claim 3, wherein the physical blocks corresponding to the limited number of dips are not available for use by the plurality of native logical bands.

5. The method of claim 2, wherein the limited number of dips are selected from good physical blocks based on an averaging metric that ensures that a native logical band in the native logical space is not adversely affected by having a good physical block redirected from that particular band.

6. The method of claim 2, wherein the limited number of dips are selected from good physical blocks based on which die each dip of the limited number of dips is located.

7. The method of claim 1, wherein the plurality of artificially limited logical bands is at least two orders of magnitude less than the plurality of native logical bands.

8. The method of claim 1, wherein the limited number of dips is at least two orders of magnitudes less than the native number of dips.

9. The method of claim 1, further comprising:
using the native logical space to write user data to the NVM; and
using the artificially limited logical space to write content log data to the NVM.

10. A system, comprising:
non-volatile memory comprising a plurality of dies, each of the plurality of dies comprising at least two planes, and each of the at least two planes comprising a plurality of physical blocks; and
control circuitry configured to:
classify the plurality of dies as a physical space array of bands and die-in-planes (dips), wherein a physical block exists at each intersection of a band and a dip, and wherein a native number of dips exist in each band of the physical space array;
define a native logical space that includes a plurality of native logical bands that logically overlay and represent the physical space array, wherein the native logical bands are used for managing relatively high volume data writes, and wherein each the plurality of native logical bands are operative to write data to the native number of dips;
define an artificially limited logical space that includes a plurality of artificially limited logical bands that exist outside of the native logical space, wherein the artificially limited logical bands are used for managing relatively low volume data writes, and wherein each of the artificially limited logical bands is operative to write data to a limited number of dips that is less than the native number of dips;
use the native logical space to write the relatively high volume data to the non-volatile memory; and
use the artificially limited logical space to write relatively low volume data to the non-volatile memory.

11. The system of claim 10, wherein each of the artificially limited logical bands comprises a plurality of logical blocks, wherein a first subset of the plurality of logical blocks is mapped to the limited number of dips, and wherein a second subset of the plurality of logical blocks is mapped as do not use blocks, wherein a combination of the first subset and the second subset is equal to the plurality of logical blocks.

12. The system of claim 10, wherein the control circuitry is configured to:
access a block manager to identify suitable physical blocks for use in the artificially limited logical space; and
select the limited number of dips from the identified physical blocks.

13. The system of claim 12, wherein the physical blocks corresponding to the limited number of dips are not available for use by the plurality of native logical bands.

14. The system of claim 10, wherein the plurality of artificially limited logical bands is at least two orders of magnitude less than the plurality of native logical bands.

15. The system of claim 10, wherein the limited number of dips is at least one order of magnitude less than the native number of dips.

16. The system of claim 10, wherein the relatively high volume data is associated with user data, and wherein the relatively low volume data is associated with content log data.

17. The system of claim 16, wherein the content log data is a time ordered chronological log of all transactional information pertaining to the non-volatile memory.

18. A method implemented in a system comprising non-volatile memory, the method comprising:
defining a native logical space comprising a first plurality of logical bands each comprising a first number of logical blocks, wherein the logical blocks in each of the first plurality of logical blocks are configured to be mapped to a second number of physical blocks;
defining an artificially limited logical space comprising a second plurality of logical bands each comprising the first number of logical blocks, wherein a first portion of the logical blocks in each of the second plurality of logical bands are mapped to a third number of physical blocks, wherein a second portion of the logical blocks in each of the second plurality of logical bands are marked as do not use blocks, and wherein the third number of physical blocks is less than the second number of physical blocks;
using the native logical space to write relatively high volume data to the non-volatile memory; and
using the artificially limited logical space to write relatively low volume data to the non-volatile memory.

19. The method of claim 18, wherein the physical blocks corresponding to the third number of physical blocks for each of the second plurality of logical bands are not used by the native logical space.

20. The method of claim 19, wherein the third number is at least one order of magnitude less than the second number.

* * * * *